United States Patent [19]

Hesse et al.

[11] 4,425,287

[45] Jan. 10, 1984

[54] PRODUCTION OF MOLDINGS FROM UNSATURATED POLYESTER RESINS

[75] Inventors: Anton Hesse, Luetzelsachsen; Dankmar Scholz, Frankenthal; Walter Nicolaus, Mutterstadt, all of Fed. Rep. of Germany

[73] Assignee: BASF Aktiengesellschaft, Fed. Rep. of Germany

[21] Appl. No.: 463,612

[22] Filed: Feb. 3, 1983

Related U.S. Application Data

[63] Continuation of Ser. No. 163,147, Jun. 26, 1980, abandoned.

[30] Foreign Application Priority Data

Aug. 4, 1979 [DE] Fed. Rep. of Germany ....... 2931737

[51] Int. Cl.$^3$ .......................... H05B 1/00; B29D 7/02; C08F 8/00
[52] U.S. Cl. ..................................... 264/22; 156/275.5; 204/159.15; 427/54.1; 264/213; 428/913
[58] Field of Search ................. 264/22, 522, 213, 212; 156/196, 238, 230, 246, 272, 307.1, 307.7; 427/54.1; 204/159.15, 159.19; 525/11, 19, 21; 430/285; 428/286, 913

[56] References Cited

U.S. PATENT DOCUMENTS

| 3,714,292 | 1/1973 | Baum et al. | 525/11 |
| 3,721,722 | 3/1973 | Baum et al. | 525/11 |
| 3,737,481 | 6/1973 | Vargin et al. | 525/19 |
| 3,858,510 | 1/1975 | Kai et al. | 430/285 |
| 3,983,290 | 9/1976 | Elcik | 428/286 |
| 4,020,193 | 4/1977 | Wismer et al. | 525/11 |
| 4,022,855 | 5/1977 | Hamblen | 264/22 |
| 4,175,177 | 11/1979 | Potts | 264/22 |
| 4,209,582 | 6/1980 | Merrill et al. | 430/285 |

FOREIGN PATENT DOCUMENTS

| 2409973 | 5/1974 | Fed. Rep. of Germany . |
| 2831679 | 5/1979 | Fed. Rep. of Germany . |
| 1412754 | 11/1975 | United Kingdom . |
| 1422778 | 1/1976 | United Kingdom . |

Primary Examiner—Edward C. Kimlin
Assistant Examiner—Louis Falasco
Attorney, Agent, or Firm—Keil & Witherspoon

[57] ABSTRACT

A process for the production of moldings from unsaturated polyester resins wherein a mixture is first prepared from
1. an unsaturated polyester,
2. a copolymerizable vinyl compound,
3. an inhibitor,
4. a photoinitiator,
5. a thickener, preferably MgO,
6. a pulverulent auxiliary which transmits ultraviolet light and/or
7. a fibrous reinforcing material and
8. further conventional additives.

This mixture is thickened, where appropriate after coating onto a sheet-like carrier, to form a semi-finished product, which is then finally shaped, and cured by UV irradiation after which it may or may not be heat-treated.

7 Claims, No Drawings

PRODUCTION OF MOLDINGS FROM UNSATURATED POLYESTER RESINS

This is a continuation, of application Ser. No. 163,147 filed June 26, 1980, now abandoned.

The invention relates to a process for the production of moldings from unsaturated polyester resins, which are thickened to form storage-stable semi-finished products, and are cured by ultraviolet radiation after shaping.

Various attempts have already been made to produce substantially storage-stable and non-tacky semi-finished products, based on unsaturated polyester resins, which can be brought to the desired shape before curing.

For example, it is possible to cure a fiber-reinforced mixture of an unsaturated polyester, a copolymerizable monomer and a photoinitiator only partially by UV radiation, protect the resulting flexible semi-finished product against further irradiation, shape it and then cure it completely by renewed irradiation. Such a procedure is described, for example, in British Pat. No. 1,422,778. However, it has been found that using this method damage to the laminate, for example delamination and white fracture, is found after shaping. Furthermore, the semi-finished product does not fully retain its shape after the load is removed, so that the process is unsuitable for the production of high quality moldings.

In another process, a mixture of an unsaturated polyester, a copolymerizable monomer, a thermoplastic saturated polymer and a photoinitiator is gelled, by heating, to give a semi-finished product, which is then shaped and finally cured by irradiation (cf., for example, German Laid-Open Application DOS No. 2,409,973). However, the article produced after gelling is so tacky that covering films and carrier films cannot be satisfactorily removed. At the high thermoplastic content which is required, the viscosity of the compositions is so high that it is difficult to produce laminates which are free from air bubbles.

German Laid-Open Application DOS No. 2,831,679 also describes photo-curable, fiber-reinforced prepregs, these being produced by swelling of a thermoplastic polymer additive (for example a cellulose ester or a vinyl chloride copolymer) in a reactive resin. Page 1, paragraph 1, states that prepregs gelled with magnesium oxide break and crumble when an attempt is made to shape them cold. This constitutes an overwhelming prejudice against the use of compositions thickened with magnesium oxide for moldable and photocurable semi-finished products.

British Pat. No. 1,412,754 describes photocurable moldable semi-finished products which are produced by reacting an unsaturated polyester with a polyurethane intermediate. If attempts are made to produce fiber-reinforced moldings by this process, damage to the laminate is once again found after shaping the semi-finished product, the damage remaining visible as white fracture lines even in the cured molding after UV irradiation. Finally, it is also known that unsaturated polyester resins may be thickened, by addition of alkaline earth metal oxides, to give prepregs having a leathery consistency. These prepregs flow when hot and can, under pressure, fill even complicated molds. They are processed exclusively by pressing at elevated temperatures, during which pressing thermal curing also occurs. Usually, relatively large amounts of a thermoplastic low-shrinkage component (polyvinyl acetate or an impact-resistant polystyrene) are added to such molding materials; on curing, this results in two polymer phases being formed, thereby reducing the transparency of the product. In most cases, the compositions also contain non-transparent fillers, e.g. calcium carbonate and dolomite. Photocuring of thickened mixtures using photoinitiators was therefore not an obvious approach and required considerable modifications to the composition of the mixtures and to the processing conditions.

U.S. Pat. No. 3,737,481 describes a process for the preparation of molding materials from unsaturated polyesters, monomers and photoinitiators, in which the polyester resin is treated with alkaline earth metal oxides before admixture of the photoinitiator. It does not provide for the presence of fillers or reinforcing fibers; the molding materials have a very low viscosity and are furthermore processed, and cured, to give coatings and not moldings.

It is an object of the present invention to provide a process for the production of moldings from unsaturated polyester resins, wherein, in a first stage, a storage-stable, non-tacky semi-finished product is produced, which can then, in a second stage, be shaped by any desired method, and finally be cured, to give moldings which do not exhibit any damage to the laminate, i.e. no delamination and no white fracture.

We have found that this object is achieved, according to the invention, by starting from a mixture comprising 1. an unsaturated polyester,
2. a copolymerizable vinyl compound,
3. from 0.005 to 0.5% by weight of an inhibitor,
4. from 0.01 to 1% by weight of a photoinitiator,
5. from 0.2 to 5% by weight of an oxide or hydroxide of lithium, magnesium or calcium, or of a metal alcoholate, which compounds act as thickeners,
6. from 1 to 50% by weight of a pulverulent filler which transmits ultraviolet light and/or
7. from 5 to 60% by weight of a fibrous reinforcing material, with or without
8. other conventional additives, the percentages being based on the total mixture.

This mixture is prepared by mixing the components (A), applied, where appropriate, to a sheet-like carrier (B), and thickened to give a semi-finished product (C). This article is then shaped (D) and cured by irradiation with ultraviolet light (E), after which it may or may not be subjected to a heat treatment (F).

The following may be noted in respect of the starting components 1 to 8:

1. Suitable unsaturated polyesters are the conventional condensation products of polybasic, especially dibasic, carboxylic acids or their esterifiable derivatives, especially their anhydrides, linked, by ester bonds, to polyhydric, especially dihydric, alcohols, which products may additionally contain radicals of monobasic carboxylic acids, of monohydric alcohols or of hydroxycarboxylic acids, and must contain, in at least some of the radicals, ethylenically unsaturated copolymerizable groups. Suitable polyhydric, especially dihydric, saturated or unsaturated alcohols are the conventional alkanediols and oxa-alkanediols, in particular containing acyclic groups, cyclic groups or both types of groups, e.g. ethylene glycol, propane-1,2-diol, propane-1,3-diol, butane-1,3-diol, butane-1,4-diol, hexane-1,6-diol, 2,2-dimethylpropane-1,3-diol, diethylene glycol, triethylene glycol, polyethylene glycol, cyclohexane-1,2-diol, 2,2-bis-(p-hydroxycyclohexyl)-propane, trimethylolpropane monoallyl ether and butene-1,4-diol. Furthermore, minor amounts of monohydric alcohols, trihydric alcohols and alcohols of even higher functionality, e.g., ethylhexanol, fatty alcohols, benzyl alcohols, 1,2-di-(allyloxy)-propan-3-ol, glycerol, pentaerythritol and trimethylolpropane may be used with the dihydric alcohols. The polyhydric, in particular dihydric, alcohols are in general reacted in stoichiometric or approximately stoichiometric amount with the polybasic, in particular dibasic, carboxylic acids or their condensable derivatives.

Suitable carboxylic acids and their derivatives include dibasic olefinically unsaturated, preferably $\alpha,\beta$-olefinically unsaturated, carboxylic acids, e.g. maleic acid, fumaric acid, chloromaleic acid, itaconic acid, citraconic acid, methyleneglutaric acid and mesaconic acid, their esters and, preferably, their anhydrides. Furthermore, other dibasic unsaturated and/or saturated or aromatic carboxylic acids, which modify the properties of the product, may be present as co-condensed units in the polyesters, examples being succinic acid, glutaric acid, α-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid and hexachloroendomethylenetetrahydrophthalic acid; equally, monobasic and tribasic carboxylic acids and carboxylic acids of even higher basicity, e.g. ethylhexanoic acid, fatty acids, methacrylic acid, propionic acid, benzoic acid, 1,2,4-benzenetricarboxylic acid and 1,2,4,5-benzenetetracarboxylic acid, may be present as co-condensed units. The use of maleic acid, maleic anhydride and fumaric acid as such modifiers is preferred.

The molar ratio of unsaturated to saturated dicarboxylic acids is preferably from 1:0 to 1:2.5.

Mixtures of unsaturated polyesters, including those which are of only limited solubility in the vinyl monomers and crystallize easily, can also be employed with advantage. Such easily crystallizing unsaturated polyesters may be synthesized, for example, from fumaric acid, adipic acid, terephthalic acid, ethylene glycol, butane-1,4-diol, hexane-1,6-diol and neopentyl glycol.

Unsaturated polyesters in which the double bonds are predominantly in the terminal positions may also be used.

The unsaturated polyesters have acid numbers of from 10 to 100, preferably from 20 to 60, and mean molecular weights of from about 800 to 6,000, preferably from about 1,000 to 4,000.

The unsaturated polyesters, which are amorphous and may or may not be crystallizable are in general prepared by melt condensation, or condensation under azeotropic conditions, of the starting materials at from 150° to 220° C., using continuous or batchwise processes.

As regards the composition of unsaturated polyesters, reference may also be made to the book by H. V. Boenig, Unsaturated Polyesters: Structure and Properties, Amsterdam, 1964. The mixture of components 1 to 8 in general contains from 10 to 80, preferably from 15 to 70, % by weight of unsaturated polyester.

2. Suitable copolymerizable ethylenically unsaturated monomeric compounds are the allyl compounds and, preferably, vinyl compounds conventionally employed for the preparation of unsaturated polyester molding materials, such as styrene, substituted styrenes, e.g. p-chlorostyrene or vinyltoluene, esters of acrylic acid and methacrylic acid with alcohols of 1 to 18 carbon atoms, eg. methyl methacrylate, butyl acrylate, ethylhexyl acrylate, hydroxypropyl acrylate, dihydrodicyclopentadienyl acrylate and butanediol diacrylate, acrylamides and methacrylamides, allyl esters, e.g. diallyl phthalate, and vinyl esters, e.g. vinyl ethylhexanoate, vinyl pivalate and others. Mixtures of the above olefinically unsaturated monomers may also be used. Preferred components (b) are styrene, α-methylstyrene, chlorostyrene, vinyltoluene, divinylbenzene and diallyl phthalate. Component (b) is in general present in the mixture in an amount of from 20 to 80, preferably from 25 to 75, % by weight.

3. The photocurable molding materials are stabilized by means of the conventional inhibitors. Examples include phenolic inhibitors, e.g. hydroquinone, substituted hydroquinones, pyrocatechol, tert.-butylpyrocatechol and nuclear-substituted pyrocatechol derivatives; quinones, e.g. benzoquinone, naphthoquinone and chloranil, nitrobenzenes, e.g. m-dinitrobenzene, thiodiphenylamine, N-nitroso compounds, e.g. N-nitrosodiphenylamine and salts of N-nitroso-N-cyclohexylhydroxylamine, and mixtures of the above. Further compounds suitable for use as additional stabilizers are salts of divalent copper, e.g. copper naphthenate and copper octoate, and quaternary ammonium salts having the structure $NR^5R^6R^7R^{8\oplus}$. $X^-$, where $R^5$, $R^6$, $R^7$ and $R^8$ are alkyl of 1 to 20 carbon atoms, aryl of 6 to 14 carbon atoms or aralkyl of 7 to 30 carbon atoms and $X^-$ is a halogen ion, preferably chloride.

The addition of selected ultraviolet absorbers, in order to stabilize the cured products against light, in some cases slightly reduces the rate of ultraviolet curing, but this decrease can be tolerated. Suitable absorbers are those of the hydroxybenzophenone, salicylic acid ester and hydroxyphenylbenztriazole series.

The mixture contains the inhibitors in an amount of from 0.005 to 0.5, preferably from 0.01 to 0.2, % by weight.

4. Suitable photoinitiators are those which can be excited by incident light of wavelengths from 300 to 600 nm to form free radicals. Examples include benzil ketals, e.g. benzil dimethyl ketal, benzil diethyl ketal, benzil dipropyl ketal, benzilmethyl allyl ketal, benzil methyl benzyl ketal, benzil ethylene ketal and benzil neopentylene ketal, benzoin ethers, e.g. benzoin isobutyl ether, benzoin methyl ether, benzoin ethyl ether, benzoin isopropyl ether and methylolbenzoin methyl ether, α-alkylbenzoin ethers and benzil in combination with aliphatic amines (e.g. methyldiethanolamine); acylphosphine oxides, e.g. pivaloyldiphenylphosphine oxide, para-toluyl-diphenylphosphine oxide, 2,4,6-trimethylbenzoyldiphenylphosphine oxide, 2,6-trimethoxybenzoyldiphenylphosphine oxide, 2,6-dichlorobenzoyldiphenylphosphine oxide, 2,6-dimethylbenzoyl-diphenylphosphine oxide and 2,3,5,6-tetramethylbenzoyldiphenylphosphine oxide; 2,2-diethoxy-acetophenone, 2-naphthalenesulfonyl chloride, 1-butyl-2-naphthalenesulfonyl chloride, 1-chloromethylnaphthalene, 1,4-dibutyl-2-naphthalenesulfonyl chloride, and disulfides, e.g. diphenyl disulfide, p,p-ditolyl disulfide and β,β-dinaphthyl disulfide.

The photoinitiators are employed in a concentration of from 0.01 to 1% by weight, preferably from 0.03 to 0.5% by weight, and mixtures of the initiators may also be used.

5. The thickeners employed are oxides or hydroxides of lithium, magnesium or calcium, and metal alcoholates, for example of magnesium, calcium, aluminum or titanium. Magnesium oxide is preferred. The thickeners are employed in amounts of from 0.2 to 5, preferably from 0.5 to 2.0, % by weight, based on the total mixture.

6. The pulverulent fillers must transmit ultraviolet light, so that curing is complete even in the deeperlying layers. Examples of suitable fillers are aluminum oxide hydrate, glass powder, quartz powder, quartz sand, glass beads, barium sulfate, talc and finely disperse silica. The mixture may contain from 1 to 50% by weight of the pulverulent fillers.

7. Suitable reinforcing agents are inorganic and organic fibers and sheet-like structures (which may or may not be woven from the said fibers), such as mats, e.g. of glass, asbestos, cellulose and synthetic organic high molecular weight polymers, such as nylon, polyacrylonitrile and polyesters, e.g. polyethylene terephthalate. If the reinforcing agent 7 is employed in the form of a mat, it is advantageous to premix components 1 to 5, as well as 6 and 8, where these are used, and to impregnate the mats with this mixture.

The mixture may contain from 5 to 60% by weight of the reinforcing agents. In many cases, it is advantageous to employ a combination of pulverulent fillers and fibrous reinforcing agents.

8. Examples of other conventional additives are lubricants, e.g. metal stearates, especially magnesium stearate and calcium stearate, or polyethylene waxes. When added in amounts of from 1 to 8% by weight, based on the total mixture, they reduce the tackiness of the semi-finished product.

In addition to the thickeners (component 5), from 0.05 to 2% by weight of a thickening accelerator may be added to the mixture. Suitable thickening accelerators are ammonium chlorides (e.g. trimethylbenzylammonium chloride, trimethylcyclohexylammonium chloride and choline chloride), phosphonium chlorides (e.g. triphenylmethylphosphonium chloride) and sulfonium halides. Further thickening accelerators which may be used are water (in amounts of from 0.1 to 0.5% by weight) and polyols (ethylene glycol or propane-1,2-diol, in amounts of from 0.2 to 2% by weight).

To reduce monomer evaporation and to form a nontacky surface, the mixtures may contain from 0.01 to 5% by weight, preferably from 0.1 to 0.5% by weight, of paraffins. These preferably have melting points of from 25° to 90° C., especially from 45° to 60° C. Instead of the paraffins, other waxy materials, for example the paraffin oxidation products known as montan wax, and their esters, long-chain fatty acids, e.g. stearic acid, stearyl stearate and the like, may be employed.

Additional initiators which may be added to the mixture containing the photoinitiator are compounds (in amounts of from 0.05 to 2.0% by weight) which form free radicals by thermal decomposition, for example peresters, e.g. tert.-butyl peroctoate and tert.-butyl perpivalate; percarbonates, e.g. bis-4-tert.-butylcyclohexyl peroxydicarbonate; diacyl peroxides, e.g. benzoyl peroxide; dialkyl peroxides, e.g. di-tert.-butyl peroxide and dicumyl peroxide; azo compounds, e.g. azodiisobutyronitrile, and C—C labile compounds, e.g. tetraphenylsuccinodinitrile, tetraphenylethanediol and tetrasubstituted dibenzyl compounds.

Finally, shrinkage-reducing additives, for example thermoplastic polymers, e.g. polystyrene, styrene copolymers, polyvinyl acetate or polymethacrylates, may also be employed, in amounts of from 1 to 20% by weight.

The moldings are produced in a plurality of process steps:

(A) First, components 1 to 6 and 8, described above, are mixed homogeneously; this step can be carried out in open vessels, for example by vigorous stirring. If a fibrous reinforcing material (component 7) in the form of mats, fabrics or webs is employed, this is advantageously impregnated with the liquid mixture of the other components.

(B) In most cases, especially in the production of fiber-reinforced moldings, it is advantageous to apply the liquid mixture to a carrier. Examples of suitable carriers are plastic films, especially polyester, polyvinyl alcohol and cellulose ester films, coated papers, thin layers (preferably from 0.05 to 1 mm thick) of fully cured unsaturated polyester resins, and metal belts. It is often advantageous to cover the applied layer of the mixture with a film of the same material as the carrier. This prevents evaporation of monomers. In general, the mixture is present on the carrier as a flat web or as a strip; its thickness is preferably from 1 to 15 mm.

(C) In the next process step, the mixture is thickened to form a semi-finished product. This is done by a polymer-analogous reaction of the thickener with the end groups of the unsaturated polyester, the rise in viscosity being brought about by the increase in molecular weight. Thickening can be carried out at room temperature, in which case it generally requires several days. It can be accelerated by raising the temperature, to a maximum of 130° C. Preferably, thickening is carried out for from 2 to 10 minutes at from 50° to 100° C. The thickening process results in non-tacky and storage-stable semi-finished products which have a pasty, leathery or stiff consistency, depending on the nature and amount of the thickeners, fillers and reinforcing materials.

(D) In the next process step, the semi-finished product is shaped, for which various methods can be used; depending on its consistency, it can be spread, trowelled, rolled, kneaded, bent or stamped, and these processes can be carried out discontinuously or continuously. In industrial operation, the conventional methods for resin processing can be employed, for example hand lay-up for the production of moldings of large area; winding, for the production of containers or pipes; discontinuous compression molding for producing large numbers of relatively small moldings; continuous laminating for producing plane or profiled, e.g. corrugated, sheets or webs; and profile drawing for producing profiled strands. In all these processes, advantages over the conventional method are found if the easily handled, storage-stable semi-finished products according to the invention are employed. It is a great advantage, in particular, that the material of the semi-finished product can be bonded to further unsaturated polyester material. For this, slight pressure, for example applied by rolling, suffices. In this way, different parts of a web, or several webs, can be bonded to one another by lap joints, or several layers can be bonded to one another by winding. Of course, it is necessary for these processes that the protective films should first be removed. If the viscosity of the semi-finished product is very high, it can be advantageous to spread a low-viscosity unsaturated polyester resin, containing a photoinitiator, on the zones to be bonded and only then to press the parts to be bonded against one another. In the compression-molding process, it is advantageous to use relatively stiff, more highly thickened semi-finished products. This is achieved by using a higher concentration of thickener and filler or by additionally using a finely divided crystalline unsaturated polyester. The blanks of the semi-finished product should roughly correspond to the size of the molding to be produced. They are cold-formed in a few seconds in a compression mold under slight pressure, namely from about 5 to 10 bar. Using this process, short cycle times can be achieved and heating the presses, which entails high consumption of energy, is unnecessary.

(E) In the next process step, the molded semifinished product is cured by irradiation with ultraviolet light. For this, it is advantageous to use ultraviolet lamps having a high emission in the long wavelength region (300–400 nm), with the maximum being preferably between 360 and 390 nm. Preferably, mercury vapor low-pressure lamps internally coated with a luminescent material (fluorescent tubes) or mercury vapor high-pressure lamps are used. In some cases, even direct sunlight suffices. The application of heat by means of hot air or of infrared radiators accelerates the curing.

In a particular embodiment of the invention, a portion of the semi-finished product is masked, during curing, with a film which is opaque to ultraviolet light. For example, black plastic film, aluminum foils or paper may be used for this purpose. No curing takes place in the masked zones, so that these can be shaped further and/or be bonded to further unsaturated polyester material which is not yet fully cured. If the zones are in the form of narrow strips, they can act as hinges. In this way it is possible, for example, to fold large moldings (for example large containers), transport them in this space-saving form, erect them, in their final shape, at their destination and cure the hinge zones by irradiation after removal of the opaque masking films. The non-cured zones can furthermore serve as zones where flanges, nozzles, endplates, covers and the like of uncured polyester material can be attached. After curing, a firm bond between this connecting zone and the attached material is achieved.

(F) In some cases it can be advantageous to subject the moldings to a thermal after-cure in order to reduce the residual monomer content. This is particularly advantageous if the mixtures originally contained compounds which form free radicals, ie. peroxides, azo compounds or C—C labile compounds. The post-curing is advantageously carried out at from 80° to 120° C.

In the Examples, parts and percentages are by weight.

The following unsaturated polyester resins were employed:

Resin A: a 65% strength solution in styrene of an unsaturated polyester of maleic acid, o-phthalic acid, ethylene glycol and 1,2-propylene glycol in the molar ratio of 1:2:2.3:0.75, stabilized with 0.01% of hydroquinone. The unsaturated polyester has an acid number of 50.

Resin B: a 67% strength solution in styrene of an unsaturated polyester of maleic acid, tetrahydrophthalic acid and diethylene glycol in the molar ratio of 1:0.5:1.5, stabilized with 0.01% of hydroquinone. The unsaturated polyester has an acid number of 43.

Resin C: a 66% strength solution in styrene of an unsaturated polyester of maleic acid, o-phthalic acid and 1,2-propylene glycol in the molar ratio of 1:0.5:1.5, stabilized with 0.01% of hydroquinone. The unsaturated polyester has an acid number of 50.

Resin D: a 65% strength solution in styrene of an unsaturated polyester of maleic acid, phthalic acid, 1,2-propylene glycol and diethylene glycol in the molar ratio of 1:0.25:1:0.25, stabilized with 0.01% of hydroquinone. The unsaturated polyester has an acid number of 40. It contains 0.3% of choline chloride, based on the styrene solution.

Resin E: a mixture of equal parts of resin A and of a 65% strength solution, in styrene, of an unsaturated polyester of maleic acid, o-phthalic acid and propane-1,2-diol in the molar ratio of 1:0.5:1.5, to which 0.6% of choline chloride was added in the melt at 150° C., after further cooling to 120° C. 0.01% of hydroquinone was stirred in, and finally the styrene was stirred in. The polyester has an acid number of 46.

Resin F: a solution comprising 60% of an unsaturated polyester of maleic acid, adipic acid, ethylene glycol and propane-1,2-diol in the molar ratio of 1:0.25:0.65:0.65, 25% of diallyl phthalate, 10% of trimethylolpropane triacrylate and 5% of vinylpyrrolidone. The acid number of the polyester is 50. 0.3% of choline chloride was stirred into the polyester melt at 150° C.

Resin G: a crystallite suspension of 36% of resin B, 28% of styrene and 36% of a crystalline polyester of fumaric acid, adipic acid and butane-1,4-diol in the molar ratio of 1:0.25:1.25, having an acid number of 20 and a melting range of from 110° to 115° C. To prepare the suspension, the mixture of the components was heated at 100° C. in a stirred flask and cooled slowly to room temperature, over 12 hours, whilst stirring. 0.01% of hydroquinone was added as an inhibitor and 0.3% of choline chloride as a thickening accelerator.

EXAMPLE 1

To prepare a photocurable molding material, a glass fiber mat (weighing 400 g/m$^2$) was impregnated, between polyester films, with a mixture of 100 parts of resin E, 1.75 parts of magnesium oxide and 0.1 part of 2,4,6-trimethylbenzoyldiphenylphosphine oxide. The glass content of the mixture was 25%. The mixture was thickened for 15 minutes in an oven at 80° C. After it had cooled to room temperature, the flexible semi-finished product could be bent through an angle of 180° without exhibiting delamination, and the protective films could be pulled off cleanly. The semi-finished product was hand-modelled over a sharp-edged wooden board (size 1.6×8.5×25 cm) and was then irradiated for 20 minutes from above with Philips TL AK 40 W/05 fluorescent tubes. The distance between the radiation source and the substrate surface was 10 cm. A hard molding, showing no white fracture anywhere, was obtained.

EXAMPLE 2

Homogeneous mixtures were prepared from the following components, using a high-speed stirrer:
54.5 parts of resin E
5.5 parts of styrene
2.4 parts of calcium stearate
0.75 part of magnesium oxide
10 parts of milled glass fibers (length 0.15 to 0.2 mm)
30 parts of aluminum oxide hydrate.

In 3 samples, 0.06 part of various compounds was added as a photoinitiator. To thicken the mixtures, they were poured into PVC frames (internal dimensions 20×20×0.5 cm) resting on polyester films; the surface was then covered with polyester film and the mixture was kept for 30 minutes in an oven. After cooling to room temperature, non-tacky easily handled semi-finished products were obtained, from which the protective films could easily be peeled. After removing the film on one side, the semi-finished products were modelled over glass tubes (diameter 4.2 mm) in such a way that the film-free face covered half the surface of the tube. The moldings were then exposed to fluorescent tubes from both sides, namely five TLA 40 W/05 lamps at a distance of 26 cm from the top and five TL AK 40 W/05 lamps at a distance of 9 cm below the substrate. After 30 or 60 minutes exposure, completely cured molding were obtained, as shown by the results of the hardness measurements, given in Table 1. None of the moldings showed any delamination.

TABLE 1

| Photoinitiator | Exposure time (min) | Barcol hardness+ top | bottom |
| --- | --- | --- | --- |
| benzil dimethyl ketal | 30 | 85–90 | 85–90 |
| methylolbenzoin methyl ether | 30 | 50–70 | max. 60 |
|  | 60 | 85–90 | 85 |
| 2,4,6-trimethylbenzoyl-diphenylphosphine oxide | 30 | 85–90 | 85–90 |

+measured by means of an Impressor 935 instrument at 23° C.

EXAMPLE 3

Homogeneous mixtures were prepared from the following components, using a high-speed stirrer:
54.5 parts of resin B
5.5 parts of styrene
2.4 parts of calcium stearate
10 parts of milled glass fibers
30 parts of aluminum oxide hydrate
The following thickeners were added:
Sample 1: 1.2 parts of calcium oxide+1.2 parts of calcium hydroxide
Sample 2: 1.2 parts of calcium oxide+0.24 part of water
Sample 3: 2.4 parts of magnesium hydroxide All the samples contained an ultraviolet initiator combination of 0.045 part of 2,4,6-trimethylbenzoyldiphenylphosphine oxide and 0.015 part of benzil dimethyl ketal. The liquid mixtures were thickened, as in Example 2, in frames, covered on both sides with polyester films, for 30 minutes at 80° C. and additionally for 5 days at room temperature. The protective films could be peeled effortlessly from the materials. After shaping round a glass tube and exposure to light for 30 minutes from both sides, hard moldings showing no trace of any delamination were obtained. The surface hardness values are shown in Table 2.

TABLE 2

| Sample | Barcol hardness (Impressor 35 instrument) top | bottom |
| --- | --- | --- |
| 1 | 80–90 | 85–90 |
| 2 | 80–85 | 60–85 |
| 3 | 85–87 | 80–87 |

EXAMPLE 4

A homogeneous mixture was prepared, using a laboratory stirrer, from resin D, 0.1% of 2,4,6-trimethylbenzoyl-diphenylphosphine oxide and 2% of magnesium oxide. 2 layers of glass fiber mats (400 g/m² each) were impregnated therewith and the composition was thickened between polyester films for 1 hour at 80° C. This gave a consistency which permitted easy shaping by hand, without delamination occurring. The semi-finished product contained 25% of glass. A laminate of size 10×10×45 cm was cut from this 3 mm thick semi-finished product and the ends, as well as 3 further zones spaced at about equal intervals across the width, were covered with 3 cm wide black PVC strips. On exposure to fluorescent tubes (TL AK 40 W/05) at a distance of 9 cm from the substrate surface, for 10 minutes, a sheet was obtained in which the masked zones remained non-crosslinked. The sheet could be bent about one of these hinges at an angle of 180°, without showing any delamination. After removing the protective films, the molding was hand-shaped by folding, and overlapping the non-crosslinked ends under pressure, to give a tube of rectangular cross-section which was then completely cured by further exposure to fluorescent tubes (TL AK 40 W/05). The bond at the lap joint was excellent.

To test the bond strength further, 2 laminates (10×10 cm) which had not been exposed to light were pressed against one another by means of a roller, the protective films having first been peeled off. After 30 minutes exposure to fluorescent tubes at a distance of 9 cm from the substrate surface, a cured molding was obtained in which the two layers showed an excellent bond to one another, as demonstrated by tapping a flat metal wedge between the layers.

EXAMPLE 5

A homogeneous mixture was prepared from the following components, using a high-speed stirrer:
68 parts of resin E
7 parts of styrene
0.055 part of 2,4,6-trimethylbenzoyl-diphenylphosphine oxide
0.02 part of benzil dimethyl ketal
25 parts of talc
1.124 parts of magnesium oxide 6 layers of glass fiber mats were impregnated with this mixture and the molding material (containing 34% of glass) was laminated to the tacky face of a gelcoat.

To produce the gelcoat, a mixture of resins A and C (in the ratio of 85:15), sensitized with the above initiator system, was knife-coated, at a thickness of 300 μm, onto polyester film and then exposed, on a plane support, for 10 minutes to fluorescent tubes (TL AK 40 W/05) at a distance of 10 cm from the substrate surface. A second gelcoat was applied to the laminate in such a way as not to trap any air bubbles. The laminate was thickened for 30 minutes at 80° C. to give a flexible leathery semi-finished product, which could be cut with a sharp knife without breaking the bond between the gelcoat and the laminate.

For curing, the molding material was exposed on a glass plate, first for 5 minutes from below to fluorescent tubes (TL AK 40 W/05) at a distance of 5 cm, and then for 15 minutes both to fluorescent tubes from below and to an infrared lamp (250 Watt) from above at a distance of 9 cm. A hard, completely cured molding was obtained. It was 6.5 mm thick, had a glossy surface and showed excellent bonding of the gelcoat to the laminate on both sides. The residual styrene content was 0.5%.

EXAMPLE 6

The following mixture was prepared, using a high-speed stirrer:
67.54 parts of resin F
0.81 part of magnesium oxide
9.65 parts of milled glass fibers 19.3 parts of talc
2.7 parts of calcium stearate The resin contained 0.075% of 2,4,6-trimethylbenzoyl-diphenylphosphine oxide and 0.025% of benzil dimethyl ketal as photoinitiators, and 0.2% of diethyl 1,2-ditoluyl-1,2-dinitrilosuccinate as a thermal free radical initiator. The viscous mixture was thickened for 50 minutes at 80° C. in a polyethylene bag and then chilled in cold water. The resulting semi-finished product was rolled out while still in the bag to give a 6–8 mm thick web which was kept for 24 hours at room temperature. After exposing both surfaces to fluorescent tubes (TL AK 40 W/05) at a distance of 10 cm from the substrate for 10 seconds, the polyethylene film was peeled off. The non-tacky semi-finished product could easily be cut and kneaded, and shaped by hand round a glass tube (diameter 7.5 cm). The molding thus obtained was exposed for 30 minutes to the lamps mentioned, at a distance of 5 cm, then released from the glass tube and kept in an oven at 120° C. for 1 hour to effect post-curing. The molding was completely cured, and could be finished by means of a file, knife or saw. The Barcol hardness was 70–85 (Barcol Impressor No. 935).

EXAMPLE 7

A homogeneous mixture was prepared from the following components, using a high-speed stirrer:
66.78 parts of resin E
3.34 parts of styrene
0.07 part of 2,4,6-trimethylbenzoyl-diphenylphosphine oxide
28.62 parts of aluminum oxide hydrate
1.19 parts of magnesium oxide Using this mixture, 2 layers of glass fiber mats were impregnated between polyester films on a continuous prepreg apparatus, and rolled out to a thickness of 2 mm. To thicken this band of material, it was passed through a heating zone (3-stage jet band dryer), then cooled by means of cold air, and rolled up. The residence time at 80° C. in the heating zone (2.5 m length)) was 5 minutes. The glass content of the semi-finished product was 25%.

After 24 hours storage at room temperature, the semi-finished product was unwound from the roll, edge-trimmed to a width of 15 cm and spirally wound, at a speed of 6 rpm, onto a rotating winding core (diameter 80 cm, length 150 cm) covered with a cellulose ester film, in such a way as to produce a seamless joint. To achieve this, it helped to press the joints against the core by means of a steel roller. After removing the protective films, the layer which had been produced was wound with a layer of rovings (450 g/m²) which had first been impregnated with non-thickened resin A containing 0.1% of 2,4,6-trimethylbenzoyl-diphenylphosphine oxide as an initiator. This was followed alternately by a layer of impregnated glass fiber mat and a layer of semi-finished product, a total of 3 sequences being applied. For curing, the winding core was rotated at 15 rpm and a battery of 18 fluorescent tubes (TL A 40 W/05, 120 cm) at a distance of 15 cm from the surface of the semi-finished product was switched on. The battery illuminated half the surface of the cylindrical core. In addition, the material was irradiated from an infrared lamp (IRE-3000), Philips). After 40 minutes exposure, a cylindrical molding possessing an excellent bond between the layers was obtained.

EXAMPLE 8

Compression-molding process

A mixture was prepared from:
100 parts of resin G
2 parts of magnesium oxide
100 parts of aluminum oxide hydrate
0.1 part of 2,4,6-trimethylbenzoyl-diphenylphosphine oxide 2 layers of a glass fiber mat (450 g/m²) were impregnated with this mixture and rolled out between 2 layers of 35 μm thick polyvinyl alcohol film. After ripening for 24 hours at room temperature, the material had thickened to the point that it could be shaped. A piece of the laminate was placed in a cold compression mold and the latter was closed. The laminate was cold-shaped under a low pressure (from 5 to 10 bar). After a few seconds, the mold was opened again. The material was so stiff that the molding could be removed without distortion. It was then irradiated with ultraviolet light from TLA 05, 40 W lamps at a distance of 10 cm. After 20 minutes, the molding was hard.

EXAMPLE 9

Profile-drawing

A mixture was prepared from
100 parts of resin D
1.2 parts of magnesium oxide
0.1 part of 2,4,6-trimethylbenzoyl-diphenylphosphine oxide 10 glass fiber rovings were drawn through an impregnating bath of the above mixture. After stripping off the excess resin, the rovings were combined to form a 5 cm wide strip which was wound up on a drum. This laminate (glass content 60%) was covered with a cellulose ester film to protect it against evaporation of styrene. After the material had thickened (1 day at room temperature) the rovings were unwound. 20 rovings were combined and drawn through a circular die of 7 mm diameter. 1 m long portions of the resulting strand were cut off and laid over one another in a grid pattern. The material was then cured under a lamp battery of 1 × 1.2 m surface area, at a distance of 10 cm. After 30 minutes, the strands had cured completely and had bonded to one another at the cross-over points.

We claim:
1. A process for the production of moldings from unsaturated polyester resins; wherein a storage-stable, non-tacky semi-finished product is first produced, which can thereafter be shaped by any desired method, and finally be cured to give moldings which exhibit no delamination and no white fracture; which comprises the following steps:
(A) preparing a molding mixture of
  1. an unsaturated polyester,
  2. a copolymerizable vinyl compound,
  3. from 0.005 to 0.5% by weight of an inhibitor,
  4. from 0.01 to 1% by weight of a photoinitiator,
  5. from 0.2 to 5% by weight of an oxide or hydroxide of lithium, magnesium or calcium, or of a metal alcoholate, which compounds act as thickeners,
  6. from 1 to 50% by weight of an aluminum oxide hydrate pulverulent filler which transmits ultraviolet light and/or
  7. from 5 to 60% by weight of a fibrous reinforcing material, with or without

8. other conventional additives, the percentage being based on the total mixture,
(B) thickening the mixture to give a non-tacky, storage stable semi-finished product,
(C) shaping the latter, and
(D) curing it by irradiation with ultraviolet light.

2. A process for the production of moldings as claimed in claim 1, wherein, during curing, a zone of the semi-finished product is masked with a film which is opaque to ultraviolet light, thereafter an additional shaping operation is carried out in the masked, non-cured zone, or additional unsaturated polyester material is bonded to this zone, and after rmoving the opaque film the zone is cured.

3. A process for the production of moldings as recited in claim 1, wherein the mixture of step (A) comprises both from 1 to 50% by weight of an aluminum oxide hydrate pulverulent filler and from 5 to 60% by weight of a fibrous reinforcing material.

4. A process for the production of moldings as recited in claim 1, wherein the mixture of step (A) comprises 5 to 60% by weight of a fibrous reinforcing material, but no aluminum oxide hydrate filler.

5. A process for the production of moldings as recited in claim 1, wherein the mixture of step (A) comprises from 1 to 50% by weight of an aluminum oxide hydrate pulverulent filler, but no fibrous reinforcing material.

6. A process for the production of moldings as recited in claim 1, wherein the molding mixture is applied to a sheet-like carrier.

7. A process for the production of moldings as recited in claim 1, wherein a subsequent heat-treatment is carried out after ultraviolet light curing.

* * * * *